Dec. 24, 1935.   L. E. LA BRIE   2,025,231
CHASSIS LUBRICATING SYSTEM
Filed Nov. 28, 1930   3 Sheets-Sheet 1

INVENTOR.
LUDGER E. LaBRIE
BY *Clinton S. Janes*
ATTORNEY

INVENTOR.
LUDGER E. LaBRIE
BY
ATTORNEY

Dec. 24, 1935.   L. E. LA BRIE   2,025,231
CHASSIS LUBRICATING SYSTEM
Filed Nov. 28, 1930   3 Sheets-Sheet 3

INVENTOR.
LUDGER E. LA BRIE
BY
ATTORNEY

Patented Dec. 24, 1935

2,025,231

UNITED STATES PATENT OFFICE 2,025,231

CHASSIS LUBRICATING SYSTEM

Ludger E. La Brie, South Bend, Ind., assignor to The Lubrication Corporation, South Bend, Ind., a corporation of Delaware Application November 28, 1930, Serial No. 498,622

9 Claims. (Cl. 184—28)

This invention relates to lubricating systems, and more particularly to chassis lubricating systems for motor vehicles. The invention is illustrated as embodied in a system which is fully automatic in the sense that no operation is required of the driver beyond keeping a supply of lubricant in the reservoir.

In one arrangement, the lubricant is fed from the reservoir to the chassis-lubricating connections by actuation of one of the usual control devices such as the brake or clutch pedal. Another simple and desirable arrangement is to provide the reservoir with a force pump actuated by the engine exhaust.

One object of the present invention is to provide a novel lubricating system which is automatically actuated as an incident to the normal operation of a motor vehicle.

Another object is the provision of such a lubricating system which is simple in construction and reliable and efficient in operation.

A further object of the invention is to provide such a system in which the pressures exerted on the lubricant are automatically limited to a predetermined maximum.

Another object is to provide such a system in which, when the motor vehicle is not in operation, no lubricant is fed to the distributing system, and when the operation of the vehicle ceases the flow of lubricant immediately stops.

Other objects and features of the invention, including novel and desirable constructions of the reservoirs, force pumps, and the like, will be apparent from the following description of the illustrative embodiments shown in the accompanying drawings, in which.

Figure 1:
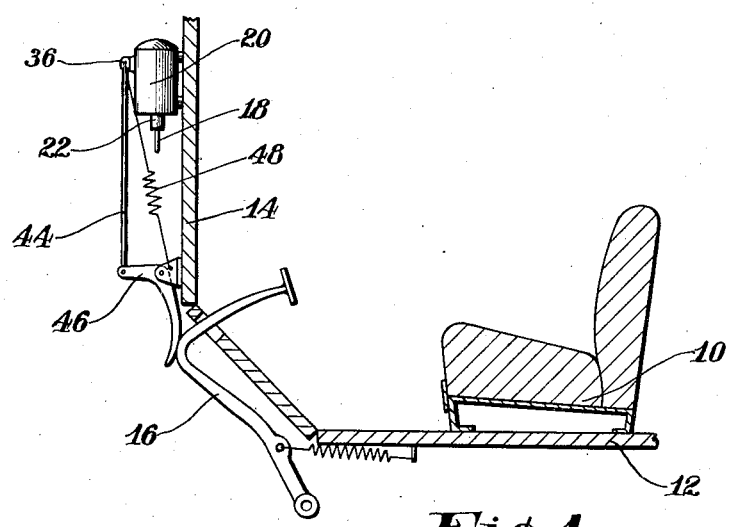
Fig. 1 is a diagrammatic side elevation of part of an automobile chassis embodying the invention.

The vehicle illustrated includes an engine with the usual exhaust system (not shown), a driver's seat 10 supported on a floorboard 12 behind a dash 14, and having a brake (or clutch) pedal 16 in front of the driver's seat. The vehicle also has a distributing system which may include a chassis-lubricating system, part of which is shown as a conduit 18.

Figure 3:
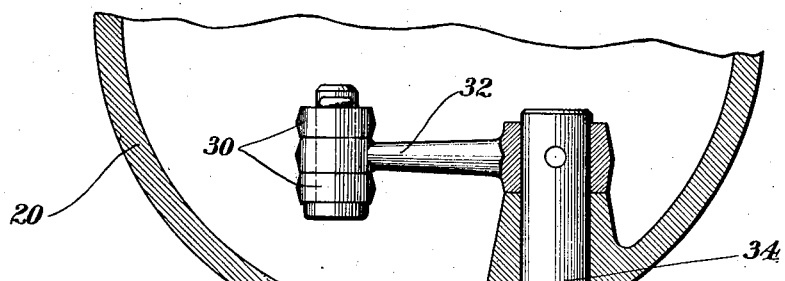
Fig. 3 is a horizontal section through part of the reservoir approximately on the line 3—3 of Fig. 2, showing the pump-actuating means.
Figure 6:
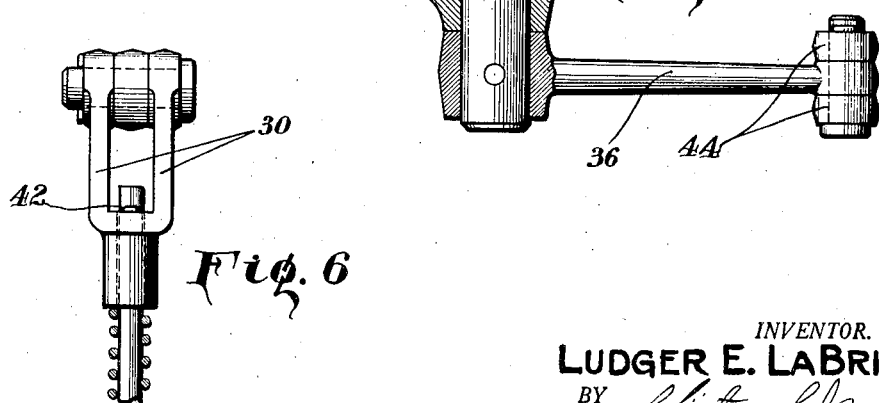
Fig. 6 is a side view of the pump operating connection shown in Fig. 2.
Figure 2:
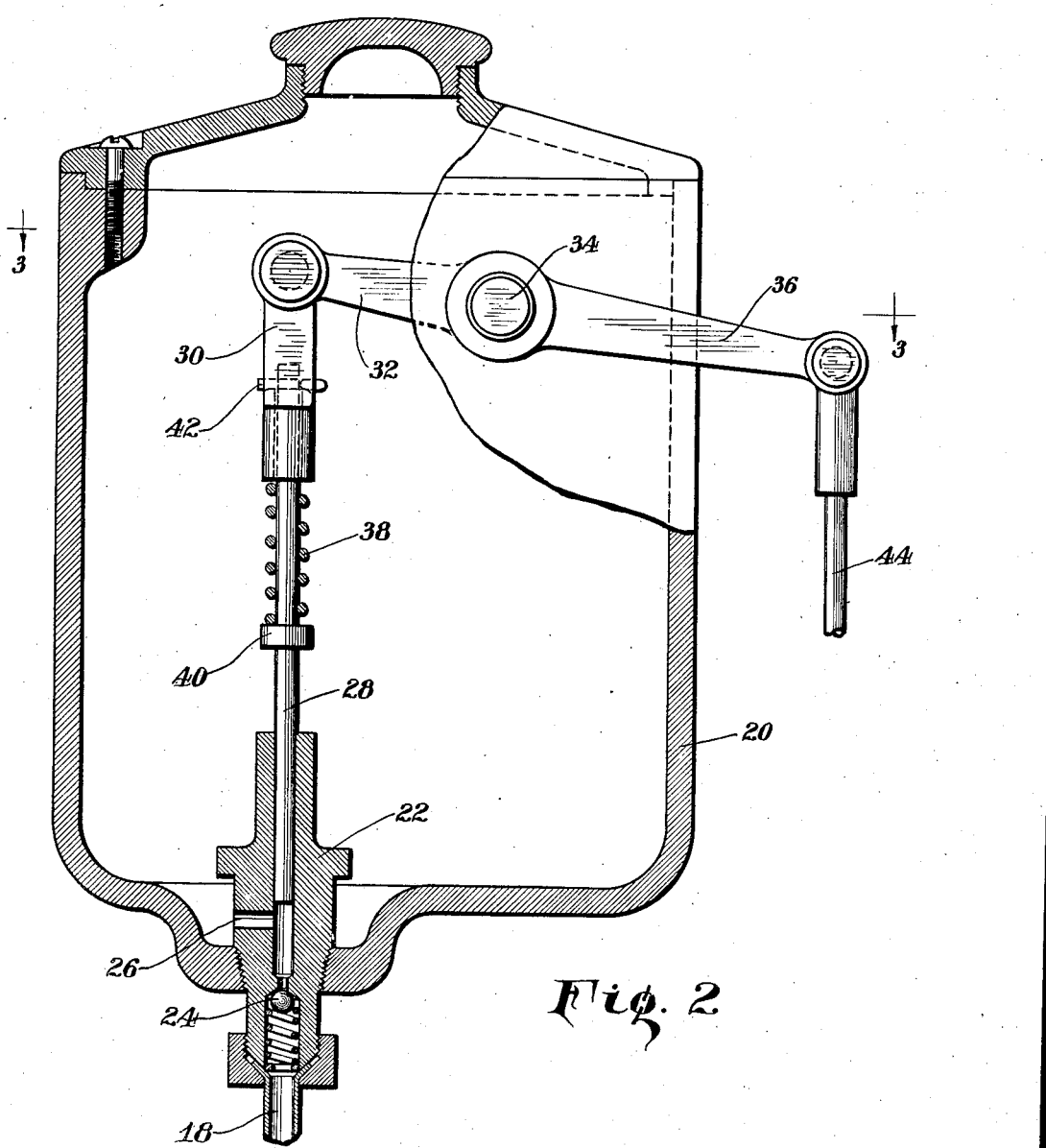
Fig. 2 is a vertical section through the lubricant reservoir of Fig. 1.

In the arrangement of Figs. 1–3, the dash supports a lubricant reservoir 20 having threaded into its base a pump cylinder 22 extending within said reservoir, provided with a spring-pressed outwardly-opening check valve 24 forming an outlet to the distributing system conduit 18, and having an intake port 26 in its side. The cylinder is provided with means for varying the pressure therein, which is here shown in the form of a pump plunger 28 having its upper end telescoping into the hollow end of a forked thrust member 30 operated by a lever 32 on a shaft 34 journaled in a bearing formed in the wall of the reservoir and operated by an arm 36 outside said reservoir. The pump plunger is operated yieldingly through a spring 38 sleeved thereon and confined between the end of member 30 and a collar 40 on the plunger. This yielding connection limits the pressure generated by the pump to a predetermined safe maximum, and further allows the operating connections for the pump to be arranged to provide full stroke operation thereof without running the risk of damage through excessive movement of the parts. The plunger is provided with suitable means such as a cross-pin 42 in its end to couple the plunger to the member 30 during the up stroke of the plunger. Sufficient looseness in the sleeve joint is provided to allow the plunger 28 to move through its normal stroke without bending.

The arm 36 is actuated, to operate the force pump described above, in one direction by a thrust rod 44 connected to a bellcrank cam lever 46 arranged in the path of pedal 16, and in the other direction by means such as a return spring 48. It will be seen that each depression of the pedal 16 to apply the brakes (or throw out the clutch) will initially operate the pump to force a small quantity of lubricant into the chassis-lubricating system 18.

Figure 4:
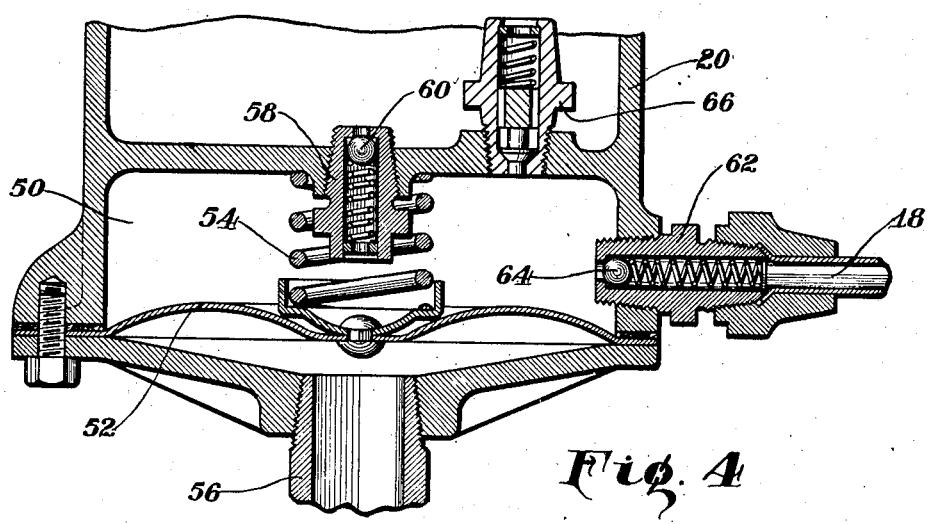
Fig. 4 is a section through the bottom of a modified form of reservoir, showing a diaphragm pump actuated by the engine exhaust.
Figure 5:
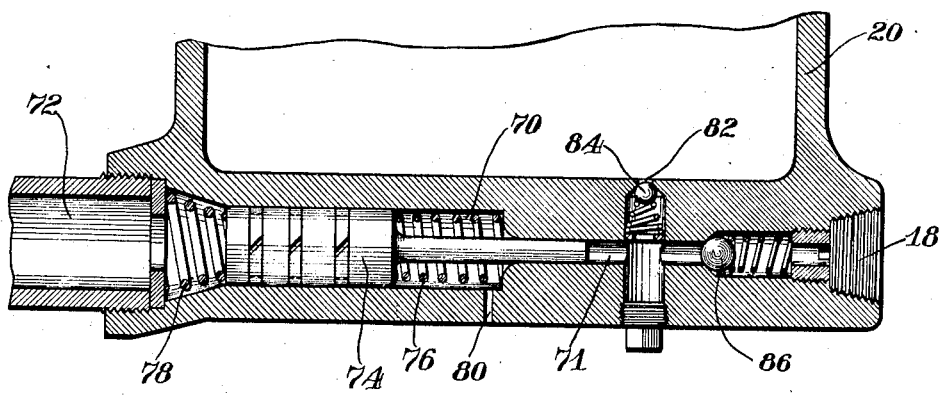
Fig. 5 is a similar section showing a plunger pump actuated by the engine exhaust.

In the arrangements of Figs. 4 and 5 the lubricant is fed by means of force pumps operated by the engine exhaust, Fig. 4 showing a diaphragm pump and Fig. 5 a plunger pump.

In Fig. 4, the bottom of the reservoir is formed as a chamber 50 divided into two parts by a movable wall here shown as a flexible diaphragm 52 urged downwardly by a spring 54, the lower part of the chamber being connected to the engine exhaust system by a conduit 56. The partition between the upper part of the chamber 50 and the reservoir proper is provided with a pump-intake 58 threaded thereinto and having a downwardly-opening spring-pressed check valve 60. The upper part of the chamber 50 is connected to conduit 18 by an outlet 62 threaded into the wall of the chamber and provided with an outwardly-opening spring-pressed check valve 64. A pressure-relief valve 66 may be provided if desired, to limit the pressure which may be imposed on the oil in chamber 50, and to vent any air that may be trapped therein.

In Fig. 5, the base of the reservoir 20 is provided with a double diameter cylinder 70, 71 connected to the exhaust at its larger end by a conduit 72 and forming by its small diameter part a lubricant pump chamber 71. The small diameter part of the cylinder has an intake port 82 controlled by a downwardly-opening spring-pressed check valve 84, and an outlet port communicating with conduit 18 and controlled by an outwardly-opening spring-pressed check valve 86. In order to vary the pressure in the lubricant pump chamber 71, suitable means is provided such as a double diameter pump plunger 74 fitting the double diameter cylinder 70, 71 and actuated by pressure from the exhaust gases against the pressure of a return spring, 76. The plunger 74 may, if desired, be provided with a steadying spring 78 weaker than spring 76, and the large part of the cylinder 70 is preferably vented at its inner end as indicated at 80.

It will be noted that in all of the embodiments of the invention herein disclosed, the actuation of the lubricating means is concomitant with the operation of the motor vehicle, and when the operation of the motor vehicle ceases, the pressure on the lubricant distributing system is relieved, whereby waste of lubricant and dripping from the bearings while the car is standing are avoided.

It will be readily understood that operation of the gas-pressure-energized forms of the present invention may be effected by the use of variations in the intake vacuum as well as in the exhaust pressure. All that would be necessary to effect such operation of the structure shown in Fig. 4 would be to form the spring 54 as a tension spring instead of a compression spring; and in Fig. 5 it would merely be necessary to make the spring 78 stronger than spring 76 instead of weaker. It is considered that these changes are so obvious that illustration thereof is unnecessary.

While several illustrative constructions have been described in detail, it is not my intention to limit the scope of the invention to those particular embodiments, or otherwise than by the terms of the appended claims.

What is claimed is:

1. A lubricating system for motor vehicles, including, a reservoir, a distributing system, means for forcing lubricant from said reservoir into said distributing system, and means for operating said forcing means from the initial actuation of a control element of the vehicle, said operating means being unaffected by the further actuation of said control element.

2. A lubricating system for motor vehicles, including, a reservoir, a distributing system, a pump for forcing lubricant from said reservoir into said distributing system, and a mechanical linkage for operating said pump from a control element of the vehicle, said linkage being arranged to transmit initial movement of the control element to said pump but being inoperative to transmit further movement thereof.

3. A lubricating system for motor vehicles including, a reservoir, a distributing system, a pump for forcing lubricant from said reservoir into said distributing system, and a mechanical linkage for operating said pump from a control pedal of said vehicle, said linkage including a lever having an arm arranged in the path of movement of said pedal and adapted to be cammed out of said path by the initial actuation of said pedal.

4. A vehicle having a driver's seat and a dash immediately in front thereof, a driver-operated pedal in front of the seat and below the dash arranged for discontinuous and varying extent of operation, a lubricant reservoir mounted on the dash and provided with a pump, and a mechanical linkage including a spring in series therewith connecting said pump to said pedal.

5. A lubricating system for motor vehicles including a reservoir, a distributing system, a pump for forcing lubricant from said reservoir into said distributing system, and a mechanical linkage for operating said pump from a control pedal of said vehicle said linkage including a lever engageable and movable by said pedal throughout the initial portion of its normal operative movement and engageable with but not movable by said pedal throughout the balance of said normal operative movement 6. A lubricating system for motor vehicles including a member discontinuously and variably movable during the normal operation of the vehicle, comprising, a reservoir, a distributing system pump for forcing lubricant from said reservoir into said system and a mechanical linkage including a resilient element in series for operating said pump from said moving member of said vehicle.

7. A lubricating system for motor vehicles including a member movable during the normal operation of the vehicle, comprising, a reservoir, a distributing system pump for forcing lubricant from said reservoir into said system and a mechanical linkage for operating said pump from said moving member of said vehicle, said linkage including a lever having a part arranged in the path of movement of said moving member and adapted to be cammed out of said path by the initial actuation of the member.

8. A lubricating system for motor vehicles including a member movable during the normal operation of the vehicle, comprising, a reservoir, a distributing system pump for forcing lubricant from said reservoir into said system and a mechanical linkage for operating said pump from said moving member of said vehicle, said linkage including a lever having a part arranged in the path of movement of said moving member and adapted to be engaged and moved by said member throughout a portion of its normal maximum travel and to remain engaged by said member but stationary during the balance of said travel of said member.

9. In combination, a motor vehicle and a lubricating system for said vehicle comprising, a lubricant distributing system, a reservoir, a pump including a pump chamber and a pumping member, said pump being connected between said reservoir and said distributing system for pumping lubricant from the reservoir into the distributing system, a check valve at the outlet side of said pump to preclude the return flow of lubricant from said distributing system to said pump chamber, means associated with an operating instrumentality of discontinuous and variable operation of said vehicle and with said pumping member for actuating said pumping member at times during the normal operation of the vehicle, said means including a mechanical linkake having a resilient element in series therein for limiting the pressure developed in said pump chamber.

LUDGER E. LA BRIE.